C. H. L. JACHAU.
Spectacles.
No. 1,130.             Patented April 20, 1839.
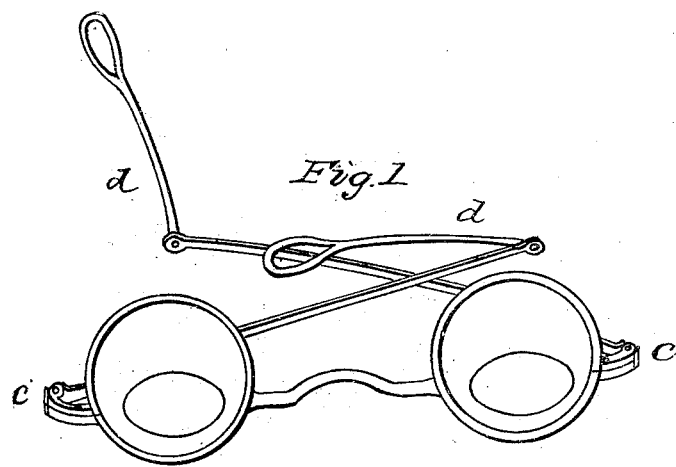
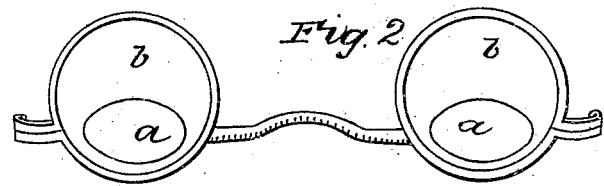

UNITED STATES PATENT OFFICE.

CHARLES H. L. JACHAN, OF NEW YORK, N. Y.

MODE OF PREPARING THE GLASSES AND CONSTRUCTING THE FRAMES OF SPECTACLES.

Specification of Letters Patent No. 1,130, dated April 20, 1839.

*To all whom it may concern:*

Be it known that I, CHARLES HENRY LEWIS JACHAN, of the city, county, and State of New York, have invented a new and useful Improvement in the Mode of Preparing the Glasses and Constructing the Frames of Spectacles, of which the following is a full and correct description, reference being had to the drawings annexed, which form a part of this specification, in which—

Figure 1 represents a view of the frames attached, and Fig. 2 the glasses, prepared with the ground portion surrounding the circular polished part.

The object of my invention is to protect the eye from too strong a light as much as possible, and this I effect by leaving only a small portion of the surface of the glasses polished and surrounding it with a ground space extending to the circumference or outside rim, intended to obstruct the passage of the rays of light and soften their effect upon the eye, leaving that portion opposite the pupil a small clear circular space. In pursuance of this object I place the said clear space at the lower part of the field of the glass, in order to leave as much ground glass as possible over it, to protect the eye from above, as is represented in Fig. 2 by $a$ the clear space, and $b$ the ground portion surrounding it. It is also necessary to provide for securing the good effects of this upper enlarged portion $b$, as much as possible above the eye, which I do in the following manner, viz., by placing the bridge used to connect the two glasses much lower than has heretofore been used, that the center of the clear space may be brought as near as possible in front of the pupil of the eye. The hinges $c$, and bows $d$ also follow the same rule, by which means I am enabled to protect the eye with about two-thirds of the ground space above it. In convex or concave glasses I make such provision, as to bring the center of the concavity or convexity thereof, within and coinciding with the center of the clear space, whether the glass be circular, elliptical, or of any other shape.

What I claim as my invention and desire to secure by Letters Patent is—

1. The mode of preparing glasses for spectacles, by leaving a small, circular clear space, opposite the pupil of the eye, to be surrounded by a ground portion extending over the remainder of the surface, so adjusted as to leave a larger proportion thereof above the eye; and in the case of concave or convex glasses, that the center of convexity or concavity shall coincide with the center of said clear, circular space.

2. I also claim in combination therewith the location of the bridge and the hinges and bows to adjust the clear space to the pupil of the eye all in the manner and for the purpose above described.

Washington, the 31st day of January, 1839.

CHARLES HENRY LEWIS JACHAN.

Witnesses:
CHARLES ROSENTHAL,
CHARLES LEWIS FLEISCHMANN.